(12) United States Patent
Lin

(10) Patent No.: US 7,188,614 B1
(45) Date of Patent: Mar. 13, 2007

(54) PETROL SAVING STRUCTURE OF A MOTOR VEHICLE

(76) Inventor: Yao-San Lin, No. 455, Dongyang Rd., Fongyuan City, Taichung County (TW)

( * ) Notice: Subject to any disclaimer, the term of this patent is extended or adjusted under 35 U.S.C. 154(b) by 0 days.

(21) Appl. No.: 11/474,947

(22) Filed: Jun. 27, 2006

(51) Int. Cl.
F02M 23/06 (2006.01)
F02B 23/00 (2006.01)

(52) U.S. Cl. .................................... 123/585
(58) Field of Classification Search ......... 123/585–588
See application file for complete search history.

(56) References Cited

U.S. PATENT DOCUMENTS 5,738,078 A * 4/1998 Chen .......................... 123/587
5,845,626 A * 12/1998 Hou ........................... 123/585

* cited by examiner

Primary Examiner—Hai Huynh
(74) Attorney, Agent, or Firm—Rosenberg, Klein & Lee

(57) ABSTRACT

An oxygen-detecting voltage controlling device includes an air filter, an electromagnetic valve, and a controlling circuit board, which is electrically connected to an engine computer for obtaining a current rotating speed value of an engine and sending a stable voltage to the engine computer to stop the engine computer from making correction by increasing amount of petrol injected through an injection nozzle; two adjustment knobs are fitted on the oxygen detecting and voltage controlling device and connected to the controlling circuit board for setting first and second rotating speed values respectively; the controlling circuit board will be activated and start sending a stable voltage to the engine computer immediately after rotating speed of the engine reaches the first rotating speed value; the controlling circuit board will be turned off and stop sending a stable voltage immediately after rotating speed of the engine reaches the second rotating speed value.

2 Claims, 6 Drawing Sheets

PETROL SAVING STRUCTURE OF A MOTOR VEHICLE

BACKGROUND OF THE INVENTION

1. Field of the Invention

The present invention relates to a petrol saving structure of a motor vehicle, more particularly one, which is equipped with an oxygen-detecting voltage controlling device for sending a stable voltage feedback to the engine computer such that the engine computer is prevented from making a correction through increasing amount of petrol injected through an injection nozzle, thus saving petrol.

2. Brief Description of the Prior Art

Referring to FIG. 6, a currently existing petrol saving structure of a motor vehicle includes an air filter 91, an air-regulating gate 92, a by-pass electromagnetic valve 93, and an engine 94.

The air filter 91 is used for filtering air such that the air can be mixed with petrol sufficiently, and it communicates with the atmosphere at one end, and is connected to one end of an inlet manifold 911 at the other end. The inlet manifold 911 is connected to an inlet by-pass pipe 912, and the engine 94 at the other end.

The air-regulating gate 92 is positioned in that portion of the inlet manifold 911 that faces an outlet of the air filter 91, and it is controlled by means of an engine computer for regulating airflow.

The by-pass electromagnetic valve 93 is connected to the inlet by-pass pipe 912 for regulating airflow.

The engine 94 is connected to the inlet manifold 911 at one side, and connected to exhaust pipes 941 at the other side, and it is controlled for a proper amount of petrol to be injected through an injection nozzle according to the opening angle of the air-regulating gate 92 by means of the engine computer, which petrol will be sufficiently mixed with air flowing in through the inlet manifold 911 at an optimal air/fuel ratio such that the engine rotates at a proper speed according to air inflow amount through the inlet manifold 911.

However, the above structure has the following disadvantages. When the petrol saving structure is used, and the air-regulating gate opens fifteen degrees, the engine will be set at a rotating speed of two thousand revolutions; because the inlet by-pass pipe has the by-pass electromagnetic valve connected thereto, the inlet by-pass pipe will open only thirteen degrees, and the by-pass electromagnetic valve will function to make up for the remaining two degrees; although the user will feel the accelerator pedal become sensitive, and the horse power increase, the engine computer of the engine, which is equipped with a high-tech detecting and petrol-injection controlling system, will detect leakage of the inlet manifold, and next make the injection nozzle inject increased amount of petrol to make up for the leaking fuel such that the air/fuel ratio reaches the optimal value (13.7 to 1). Consequently, petrol is wasted because the amount of petrol injected through the injection nozzle is greater than necessary.

SUMMARY OF THE INVENTION

It is a main object of the invention to provide an improvement on a petrol saving structure of a motor vehicle to overcome the above-mentioned problems.

The petrol saving structure of the present invention includes an oxygen-detecting voltage controlling device includes an air filter, an electromagnetic valve, and a controlling circuit board, which is electrically connected to an engine computer for obtaining a current rotating speed value of an engine and for sending a stable voltage to the engine computer to prevent the engine computer from making a correction by increasing amount of petrol injected through an injection nozzle. A start adjustment knob and a stop adjustment knob are fitted on the oxygen-detecting voltage controlling device and connected to the controlling circuit board for setting first and second rotating speed values respectively. The controlling circuit board will be activated and start sending a stable voltage to the engine computer when the current rotating speed of the engine is between the first and the second rotating speed values set through the start adjustment knob and the stop adjustment knob, thus saving petrol.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
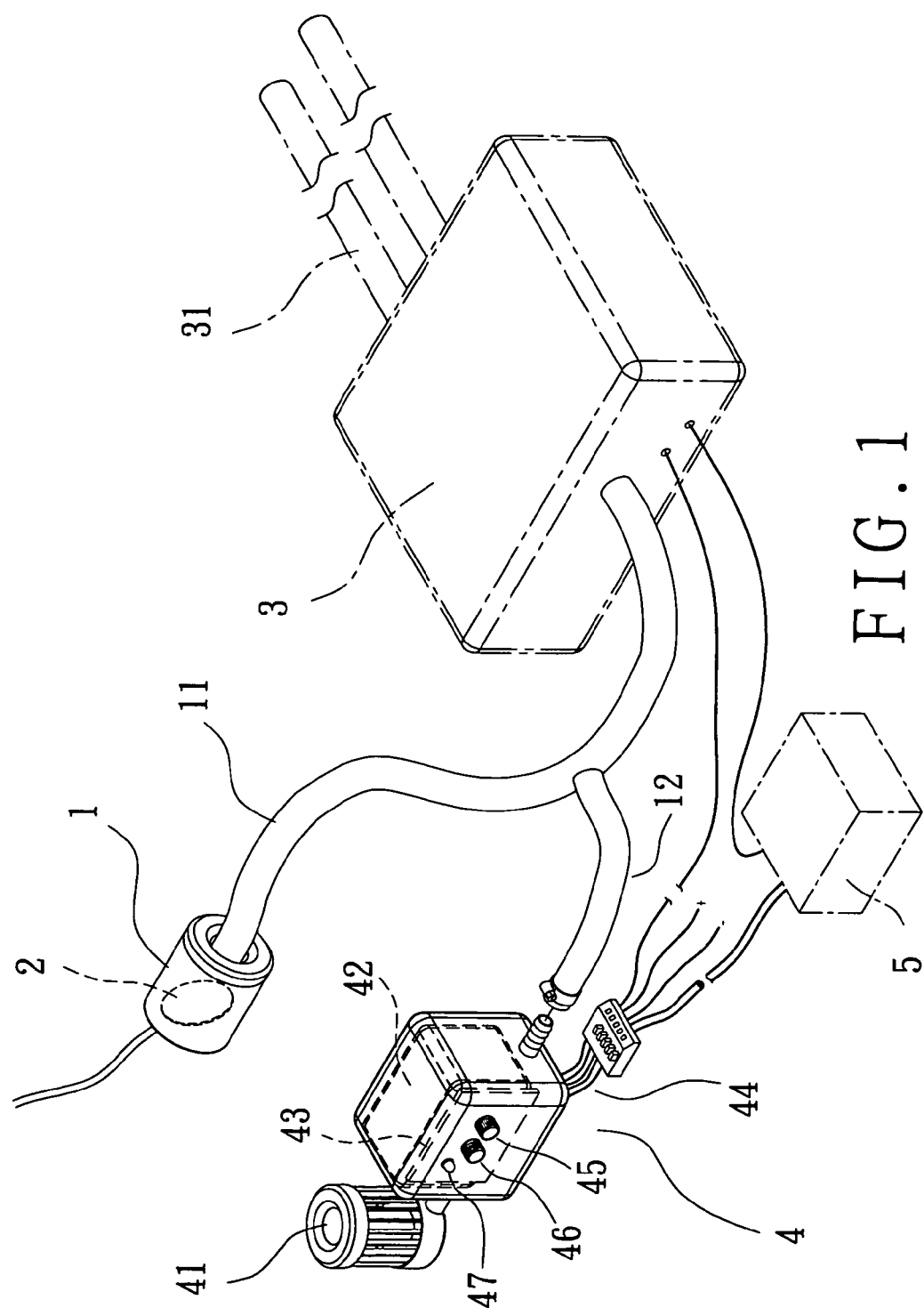
FIG. 1 is a perspective view of the present invention.
Figure 2:
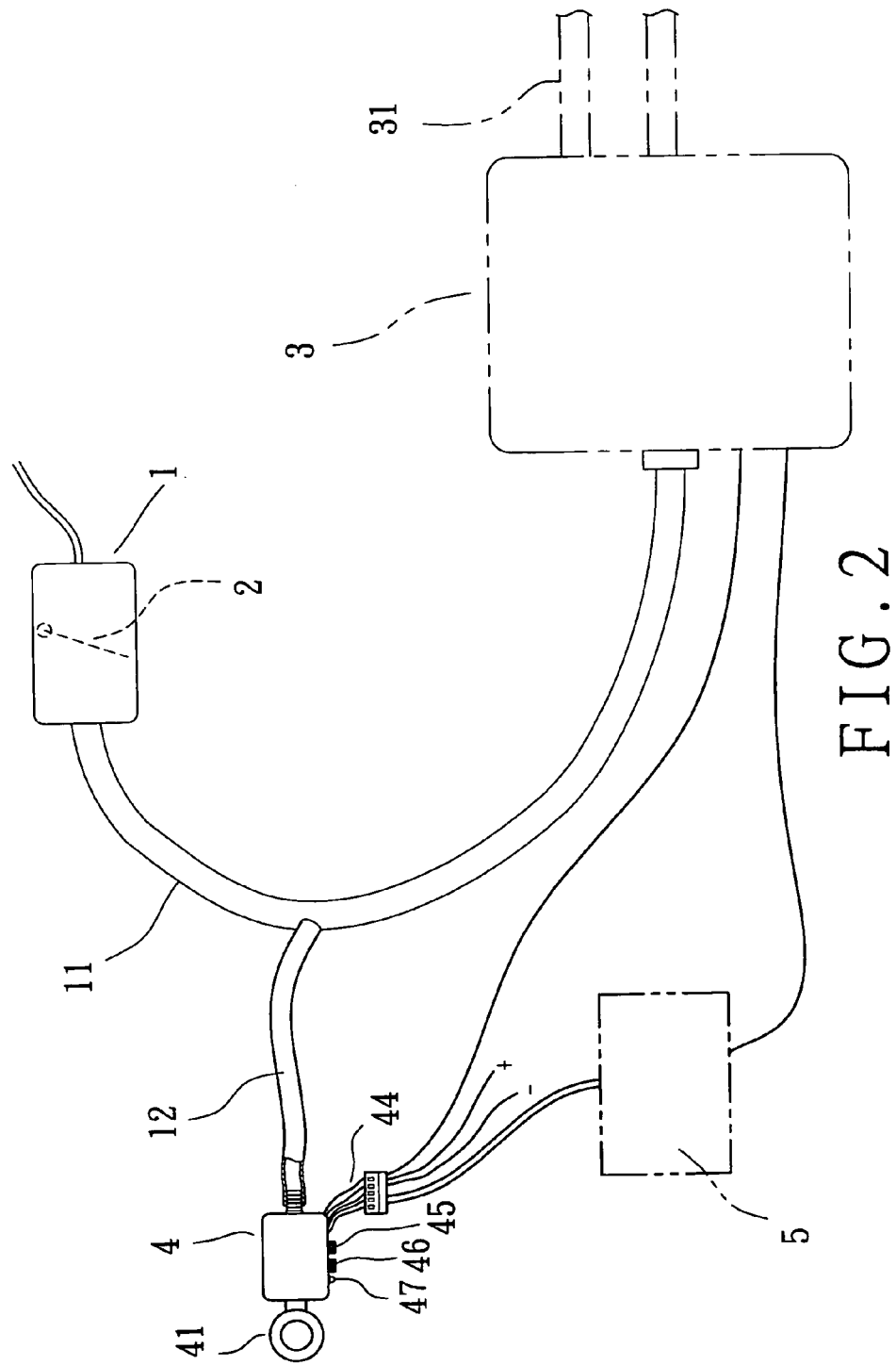
FIG. 2 is a top view of the present invention.
Figure 3:
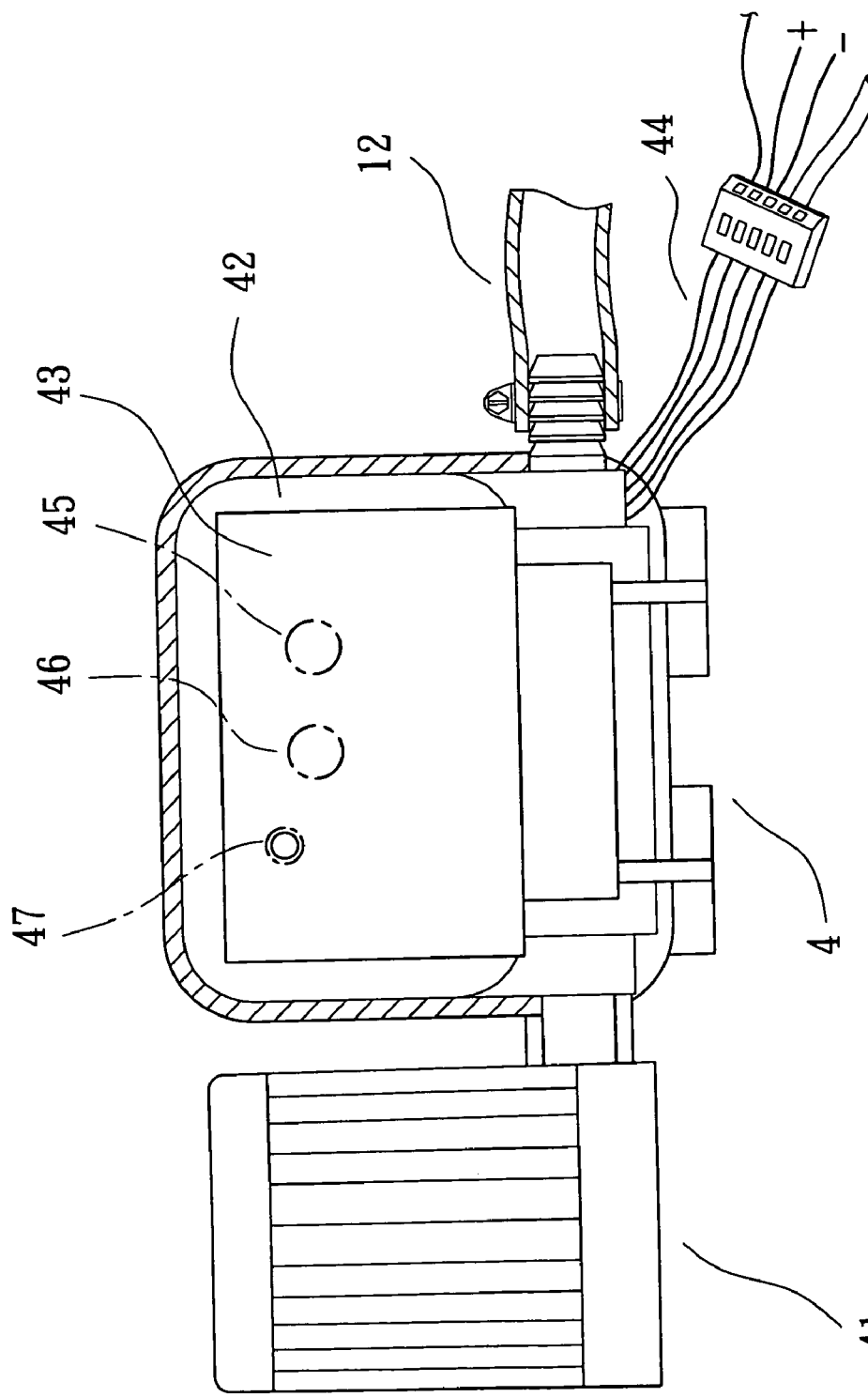
FIG. 3 is a partial lateral sectional view of the present invention.
Figure 4:
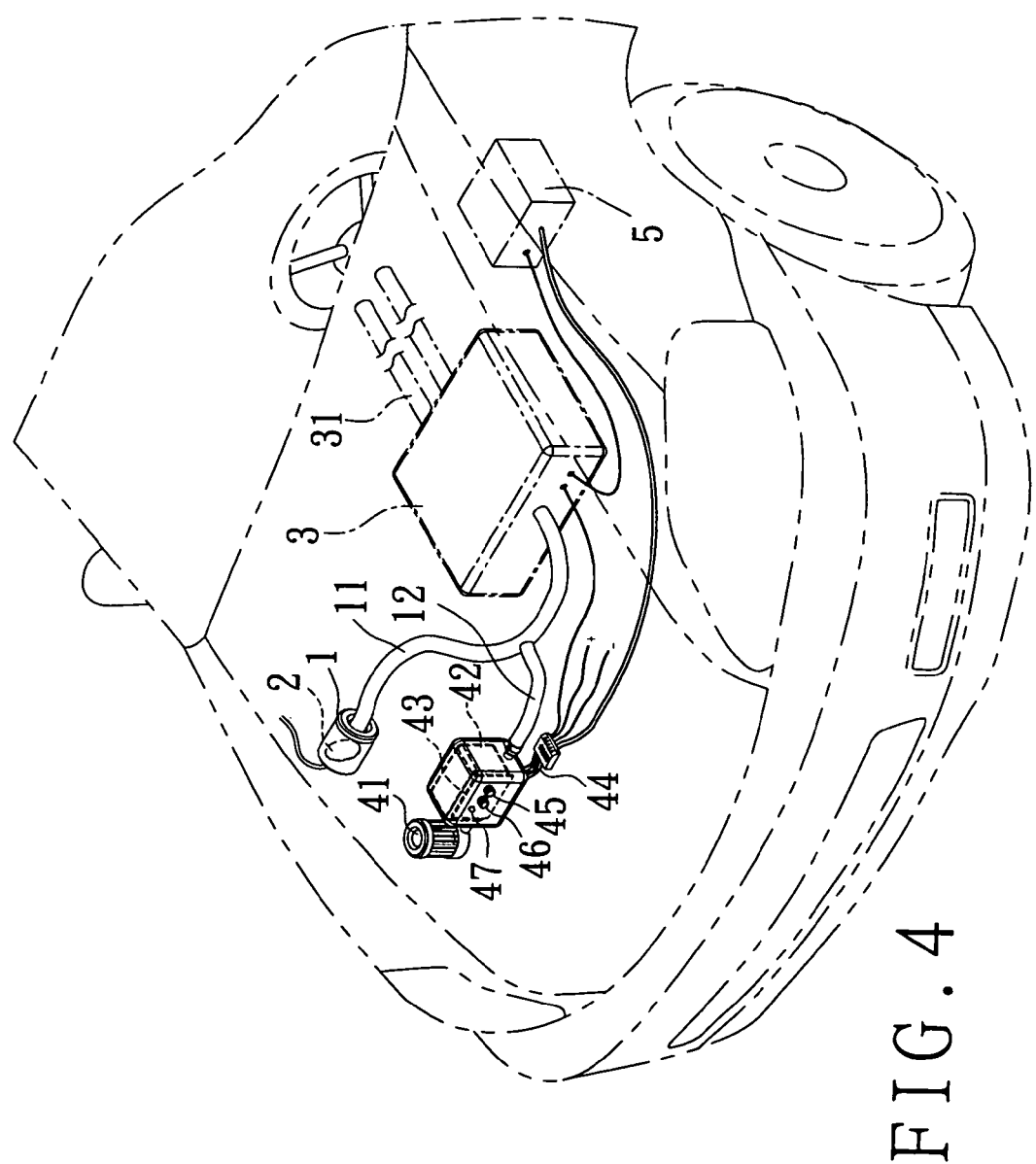
FIG. 4 is a perspective view of the present invention in use.
Figure 5:
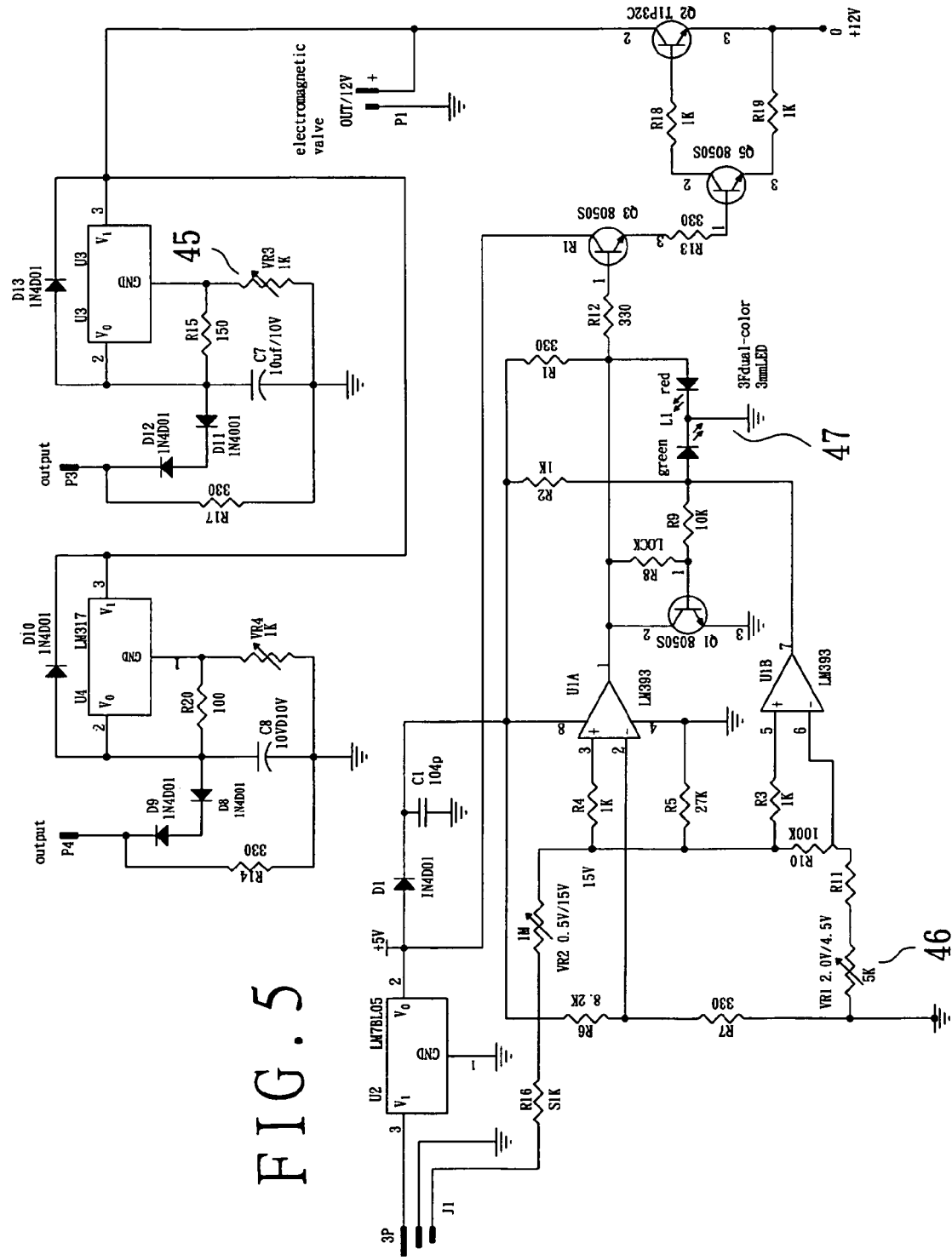
FIG. 5 is a circuit diagram of the controlling circuit board in the present invention.
Figure 6:
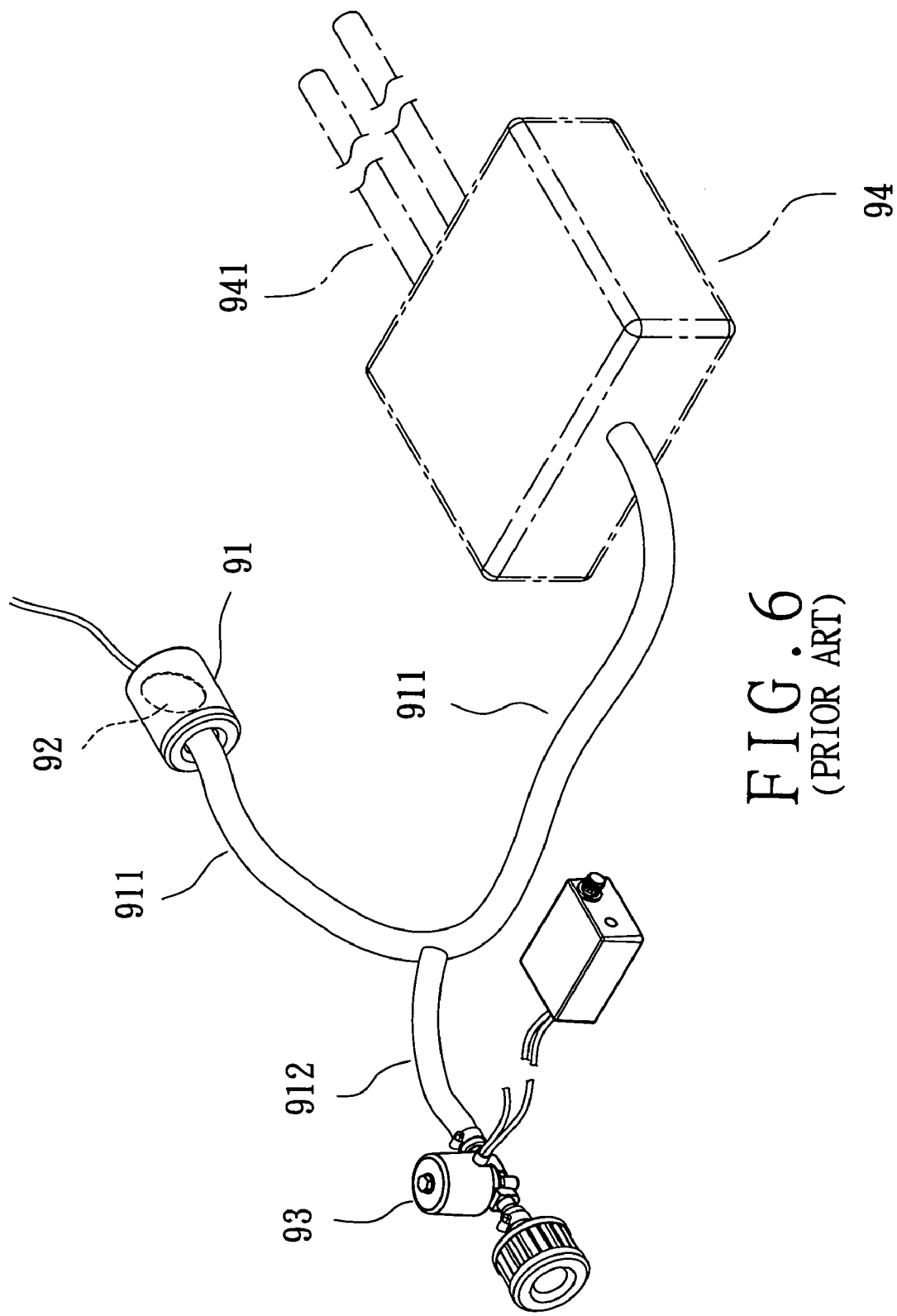
FIG. 6 is a perspective view of the prior art.

Referring to FIGS. 1 to 5, a preferred embodiment of a petrol saving structure of a motor vehicle includes an air filter 1, an air-regulating gate 2, an engine 3, and an oxygen-detecting voltage controlling device 4.

The air filter 1 is used for filtering air such that the air can be sufficiently mixed with petrol. The air filter 1 communicates with the atmosphere at one end, and is connected to one end of an inlet manifold 11 at the other end. The inlet manifold 11 is connected to an inlet by-pass pipe 12, and the engine 3 at the other end.

The air-regulating gate 2 is positioned in that portion of the inlet manifold 11 that faces an outlet of the air filter 1, and it is controlled by means of an engine computer 5 for regulating airflow.

The engine 3 is connected to the inlet manifold 11 at one side, and connected to exhaust pipes 31 at the other side, and it is controlled for a proper amount of petrol to be injected through an injection nozzle according to the opening angle of the air-regulating gate 2 by means of the engine computer 5, which petrol will be sufficiently mixed with air flowing in through the inlet manifold 11 at an optimal air/fuel ratio such that the engine rotates at a proper speed according to air inflow amount through the inlet manifold 11.

The oxygen-detecting voltage controlling device 4 includes an air filter 41, an electromagnetic valve 42, and a controlling circuit board 43. The air filter 41 is positioned next to an air inlet for filtering air. The electromagnetic valve 42 is used for controlling the amount of airflow. The controlling circuit board 43 are electrically connected to the engine computer 5 by means of controlling signal wires 44; thus, current rotating speed value of the engine 3 will be sent to the controlling circuit board 43 through the controlling signal wires 44, and the controlling circuit board 43 is used for sending a stable voltage to the engine computer 5 so as to prevent the engine computer 5 from making a correction by increasing the amount of petrol injected through the injection nozzle.

The oxygen-detecting voltage controlling device 4 has a start adjustment knob 45, a stop adjustment knob 46, and an indicating lamp 47 fitted thereon, which are electrically connected to the controlling circuit board 43; the start adjustment knob 45 is used for setting a first (lower) engine rotating speed value while the stop adjustment knob 46 is used for setting a second (higher) engine rotating speed value greater than the first engine rotating speed value. The controlling circuit board 43 will be activated and start sending a stable voltage to the engine computer 5 as soon as the rotating speed of the engine 3 reaches the first (lower) engine rotating speed value; thus, the engine computer 5 is prevented from increasing the amount of petrol injected through the injection nozzle. And, the controlling circuit board 43 will be turned off and stop sending a stable voltage to the engine computer 5 as soon as the rotating speed of the engine 3 reaches the second (higher) engine rotating speed value. The indicating lamp 43 will shine when the controlling circuit board 43 is sending a stable voltage to the engine computer 5.

Referring to FIGS. 1 to 4, to use the oxygen-detecting voltage controlling device 4 on a motor vehicle, first a first (lower) engine rotating speed value, and a second (higher) engine rotating speed value are set according to the engine displacement and the kind of the motor vehicle by means of using the start adjustment knob 45 and the stop adjustment knob 46 such that a current rotating speed of the engine will be between the first and the second engine rotating speed values during gear shifting. Therefore, the oxygen-detecting voltage controlling device 4 will send a stable voltage feedback to the engine computer 5 during gear shifting, and in turn the engine computer 5 won't increase the amount of petrol injected through the injection nozzle, thus saving petrol.

From the above description, it can be seen that the petrol saving structure of a motor vehicle of the present invention has the following advantage: during gear shifting, a current rotating speed of the engine will be between the first and the second engine rotating speed values set by means of the start adjustment knob and the stop adjustment knob, and the oxygen-detecting voltage controlling device will send a stable voltage feedback to the engine computer to prevent the engine computer from increasing the amount of petrol injected through the injection nozzle. Consequently, it will save petrol to use the present invention.

What is claimed is:

1. A petrol saving structure of a motor vehicle, comprising
   (a) an inlet by-pass pipe; and
   (b) an oxygen-detecting voltage controlling device connected to the inlet by-pass pipe; the oxygen-detecting voltage controlling device including:
   an air filter positioned next to an air inlet for filtering air;
   an electromagnetic valve;
   a controlling circuit board, the controlling circuit board being electrically connected to an engine computer by means of a plurality of controlling signal wires such that a current rotating speed value of an engine will be sent to the controlling circuit board through the controlling signal wires; the controlling circuit board being provided for sending a stable voltage through the controlling signal wires to the engine computer so as to stop the engine computer from making correction by increasing amount of petrol injected through an injection nozzle; and
   a start adjustment knob electrically connected to the controlling circuit board for setting a first engine rotating speed value; the controlling circuit board being going to be activated and start sending a stable voltage to the engine computer as soon as a rotating speed of the engine reaches the first engine rotating speed value;
   a stop adjustment knob electrically connected to the controlling circuit board for setting a second engine rotating speed value, which is greater than the first engine rotating speed value; the controlling circuit board being going to be turned off and stop sending a stable voltage to the engine computer as soon as a rotating speed of the engine reaches the second engine rotating speed value.

2. The petrol saving structure of a motor vehicle as recited in claim 1, wherein the oxygen-detecting voltage controlling device has an indicating lamp fitted thereon for indicating that the controlling circuit board is sending a stable voltage to the engine computer.

* * * * *